United States Patent
Ryu et al.

(10) Patent No.: US 7,660,589 B2
(45) Date of Patent: Feb. 9, 2010

(54) METHOD FOR DETERMINING MOBILE COMMUNICATION TERMINAL USER'S POINT OF INTEREST AND APPARATUS FOR PROVIDING GEOGRAPHIC INFORMATION USING THE METHOD

(75) Inventors: Hee-seob Ryu, Suwon-si (KR); Jong-ho Lea, Seongnam-si (KR); Seong-woon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 796 days.

(21) Appl. No.: 11/435,794

(22) Filed: May 18, 2006

(65) Prior Publication Data

US 2006/0286987 A1    Dec. 21, 2006

(30) Foreign Application Priority Data

Jun. 15, 2005    (KR) .................... 10-2005-0051456

(51) Int. Cl.
    *H04W 24/00*    (2006.01)

(52) U.S. Cl. .................... 455/456.1; 455/440; 455/441; 455/414.1; 455/414.2; 455/456.3

(58) Field of Classification Search .............. 455/456.1, 455/456.3, 414.2; 340/995, 998
    See application file for complete search history.

(56) References Cited

U.S. PATENT DOCUMENTS

| | | | |
|---|---|---|---|
| 6,529,143 B2* | 3/2003 | Mikkola et al. | 340/995.1 |
| 6,559,872 B1* | 5/2003 | Lehikoinen et al. | 715/856 |
| 6,774,838 B2 | 8/2004 | Sun | 342/357.06 |
| 2002/0047787 A1* | 4/2002 | Mikkola et al. | 340/995 |
| 2006/0058041 A1* | 3/2006 | Cheng | 455/456.3 |
| 2007/0037558 A1* | 2/2007 | Yu et al. | 455/414.1 |
| 2007/0038363 A1* | 2/2007 | McGrath | 701/117 |

* cited by examiner

*Primary Examiner*—David Q Nguyen
(74) *Attorney, Agent, or Firm*—Staas & Halsey LLP

(57) ABSTRACT

A method for determining a mobile communication terminal user's points of interest, in which geographic information of an area where the mobile communication terminal user stays longer than a threshold time, and an apparatus for providing the geographic information using the method. The method includes providing identification information received from a mobile communication repeaters, which use a limited number of the identification information and repeatedly reuse the identification information at different places.

15 Claims, 7 Drawing Sheets

| RECEIPT TIME | FIRST IDENTIFICATION INFORMATION | SECOND IDENTIFICATION INFORMATION | THIRD IDENTIFICATION INFORMATION |
|---|---|---|---|
| 2005.03.09 08:50:00 | 122 | 74 | 424 |
| 2005.03.09 08:55:00 | 122 | 14 | 10 |
| ... | ... | ... | ... |

| WGS84 COORDINATES | | TM COORDINATES | | LOT NUMBER INFORMATION |
|---|---|---|---|---|
| LATITUDE | LONGITUDE | X | Y | |
| 122.57 | 037.84 | 58496.2 | 87623.4 | NONGSEO-RI, KIHEUNG-EUP, YONGIN-SI, KYOUNGKI-DO |
| ... | ... | ... | ... | ... |

METHOD FOR DETERMINING MOBILE COMMUNICATION TERMINAL USER'S POINT OF INTEREST AND APPARATUS FOR PROVIDING GEOGRAPHIC INFORMATION USING THE METHOD

CROSS-REFERENCE TO RELATED APPLICATION

This application claims priority from Korean Patent Application No. 10-2005-0051456 filed on Jun. 15, 2005 in the Korean Intellectual Property Office, the disclosure of which is incorporated herein by reference.

BACKGROUND OF THE INVENTION

1. Field of the Invention

The present invention relates to providing geographic information, and more particularly, to a method for determining a mobile communication terminal user's point of interest and an apparatus for providing the geographic information using the method.

2. Description of Related Art

Recently, a technique for measuring the position of a mobile communication terminal has come into wide use. The technique can be implemented using a conventional communication system based on a base station or using a global positioning system (GPS).

An apparatus for providing geographic information of a mobile communication terminal according to the conventional art measures the position of a mobile communication terminal periodically or at a user's request and provides geographic information of the measured position to the user using visual information such as an electronic map.

Thus, the user can be provided with a service such as a service for checking a user's current position or the direction in which the user is moving. In particular, position information of the mobile communication terminal may be combined with other information and provided as a location based service (LBS) providing an application required by the user.

There is a need for various services using position information. For example, a service for setting an area where a mobile communication terminal user stays for a long time as a point of interest (POI) and providing the POI at the request of the mobile communication terminal user is required so that the mobile communication terminal user can check his/her past schedule.

To provide such a service according to the conventional art, the position of a mobile communication terminal should be periodically measured or a user should directly request measurement of the position of the mobile communication terminal while staying in a POI. However, when the position of a mobile communication terminal is periodically measured, position measurement is also performed in not only a POI but also other areas, increasing the battery consumption of the mobile communication terminal and causing a user's inconvenience of having to check all geographic information corresponding to the measured position. Once a position measurement command is directly input by a user, the user should input the position measurement command whenever a POI is reached, which is quite a bothersome work.

U.S. Pat. No. 6,774,838 discloses a power saving device and method for a GPS receiver in which, for a case when a GPS receiver is used as a car navigator, movement of a car is detected, and an operation of the GPS receiver is stopped when the car does not move and the GPS receiver is actuated when the car moves, thereby providing navigation information. U.S. Pat. No. 6,774,838 can solve the power consumption problem of a GPS receiver used as a car navigator, but is not suitable for personal use.

BRIEF SUMMARY

An aspect of the present invention provides a service for providing geographic information of an area where a mobile communication terminal user stays longer than a predetermined time as a mobile communication terminal user's point of interest (POI).

An aspect of the present invention also provides a reduction in power consumption caused by position measurement.

An aspect of the present invention also provides a reduction in the amount of computation required for position measurement.

According to an aspect of the present invention, there is provided a method of determining a mobile communication terminal user's point of interest. The method includes providing identification information received from a mobile communication repeater, the identification information being usable to identify the mobile communication repeater, matching geographic information of a mobile communication terminal to the provided identification information if there is identification information that is the same as the provided identification information among pieces of identification information had been received within a first threshold time at the latest before receiving the provided identification information, and providing the geographic information as point of interest if identification information that is the same as the identification information to which the geographic information is matched is provided for longer than a second threshold time.

According to another aspect of the present invention, there is provided an apparatus for providing geographic information of a mobile communication terminal, the apparatus including a receiving module which provides identification information received from a mobile communication repeater usable to identify the mobile communication repeater, a geographic information setting module which matches geographic information of a mobile communication terminal to the provided identification information if there is identification information that is the same as the provided identification information among identification information received within a first threshold time at the latest before the receipt of the provided identification information, and a point-of-interest providing module which provides the geographic information as the mobile communication terminal user's point of interest if identification information that is the same as the identification information to which the geographic information is matched is provided for longer than a second threshold time.

According to another aspect of the present invention, there is provided a method of determining a point of interest, the method including: receiving, from at least one mobile communication repeater, identification information usable to identify a location of a user in relation to the at least one mobile communication repeater; determining whether there is present stored identification information received within a first threshold time before receipt of the received identification information and, when there is present such stored identification information, comparing the stored identification information with the received identification information to identify identical identification information; matching geographic information of a mobile communication terminal to the received identification information when there is stored identification information that is identical to the received identification information; determining whether the stored identification information that is identical to the received identification information to which the geographic information is matched is received for longer than a second threshold time; and providing the geographic information as point of interest when identification information that is the same as the identification information to which the geographic information is matched is provided for longer than a second threshold time.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Figure 1:
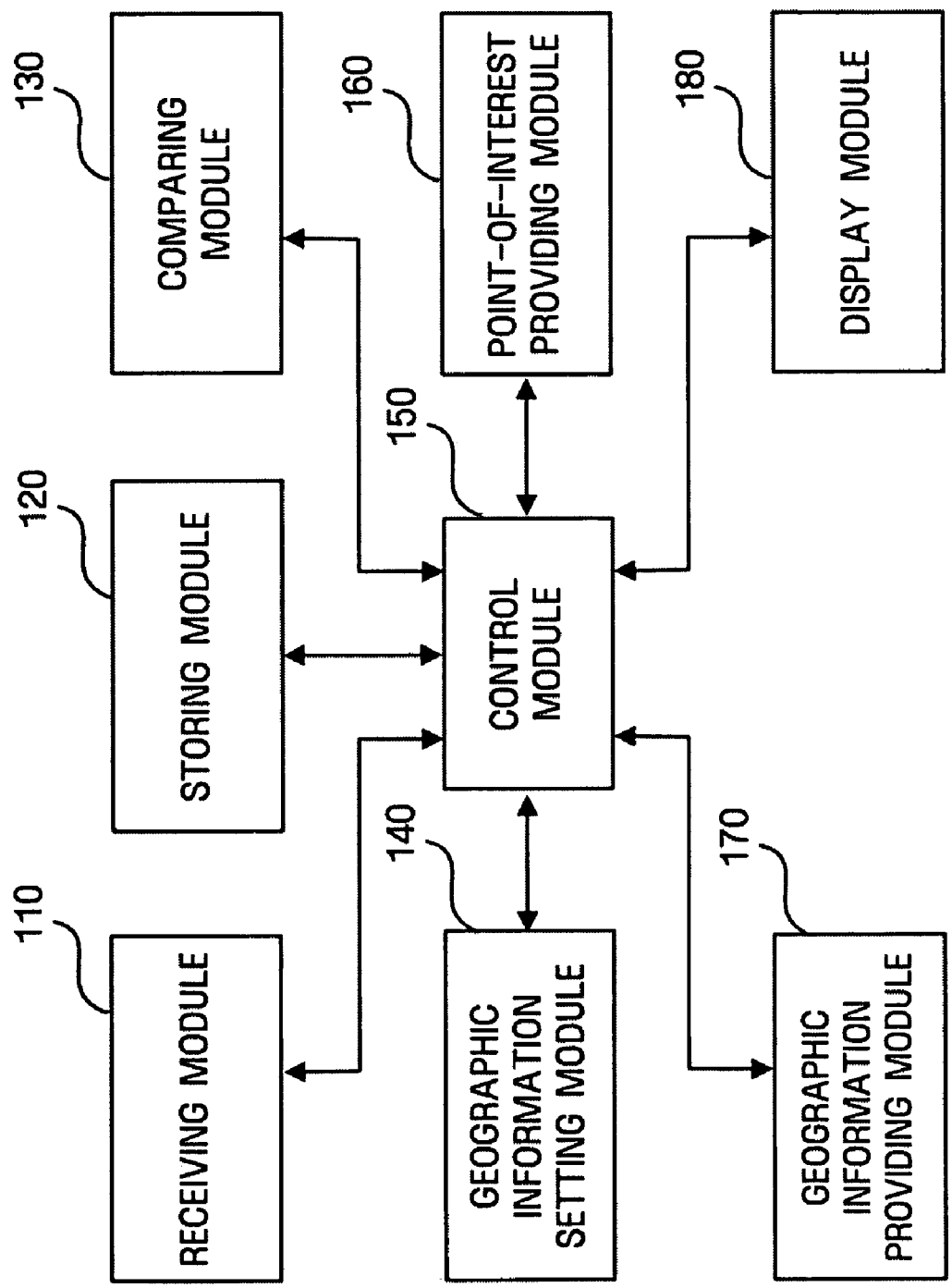
FIG. 1 is a block diagram of an apparatus for providing geographic information according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an apparatus for providing geographic information according to an embodiment of the present invention.

The apparatus includes a receiving module 110, a storing module 120, a comparing module 130, a geographic information setting module 140, a control module 150, a point-of-interest (POI) providing module 160, a geographic information providing module 170, and a display module 180. The apparatus may be included in a mobile communication terminal such as a cellular phone or a personal digital assistant (PDA).

The receiving module 110 provides identification information received from a mobile communication repeater. Here, the mobile communication repeater relays communications between mobile communication terminals like a base station. The identification information is used for identifying the mobile communication repeater. As the identification information, pseudo noise (PN) or a base station identifier (BID) output from the mobile communication repeater may be used. However, the present embodiment is not limited to the example described above, and at least one different information output from the mobile communication repeater may be used as the identification information of the mobile communication repeater. The configuration of the receiving module 110 is illustrated in detail in FIG. 2.

Figures 2, 3:
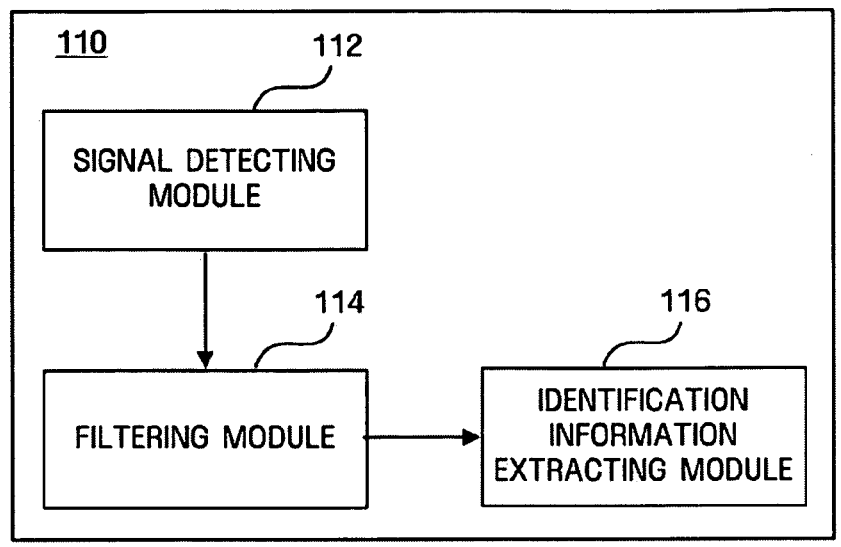
FIG. 2 is a detailed block diagram of a receiving module of FIG. 1.
FIG. 3 illustrates information stored in a storing module of FIG. 1 according to an embodiment of the present invention.

As illustrated in FIG. 2, the receiving module 110 includes a signal detecting module 112, a filtering module 114, and an identification information extracting module 116.

The signal detecting module 112 periodically detects a signal output from the mobile communication repeater and provides the detected signal to the filtering module 114. A plurality of mobile communication repeaters may exist around a single mobile communication terminal. Thus, a plurality of signals, output from a plurality of mobile communication repeaters existing adjacent to the mobile communication terminal, may be periodically detected by the signal detecting module 112.

The filtering module 114 filters a threshold number of signals among signals provided from the signal detecting module 112 in an increasing order of signal strength. The threshold number may be preset according to the characteristic or computational capability of a mobile communication terminal to which the apparatus for providing geographic information according to an embodiment of the present invention is to be applied.

According to another embodiment of the present invention, the filtering module 114 may primarily filter signals whose strengths are greater than a threshold strength among signals provided from the signal detecting module 112 and may secondarily filter a threshold number of signals among the primarily filtered signals in an increasing order of signal strength.

The identification information extracting module 116 extracts the identification information included in signals filtered by the filtering module 114. The identification information is used for identifying a mobile communication repeater outputting a signal and may be a PN or a BID.

Referring back to FIG. 1, the storing module 120 stores the identification information provided from the receiving module 110. The identification information may be stored together with the receipt time, i.e., the time when the identification information is received. An example of the identification information and the receipt time are illustrated in tabular form in FIG. 3. As illustrated in FIG. 3, three pieces of identification information are matched to the same receipt time. This means that a threshold number determining the number of signals to be filtered by the filtering module 114 is set to 3, and the receiving module 110 extracts identification information from three signals and provide the identification information. Although not shown in FIG. 3, identification information satisfying a predetermined condition to be described below may be stored together with geographic information corresponding to position of the mobile communication terminal at the time when the identification information is received.

Figures 4, 5:
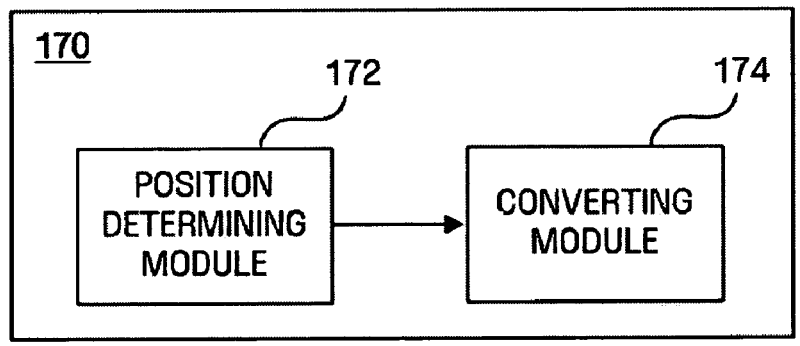
FIG. 4 illustrates a database in a table form for converting position information into geographic information according to an embodiment of the present invention.
FIG. 5 is a detailed block diagram of a geographic information providing module of FIG. 1.

The storing module 120 may store a database required for providing geographic information corresponding to position information. For example, if the geographic information providing module 170 measures a position using a GPS, the storing module 120 may store WGS84 coordinate information required for converting WGS84 coordinates obtained as a result of the position measurement into geographic information, and TM coordinate information and lot number information corresponding to the WGS84 coordinate information, as shown in FIG. 4.

When identification information is provided from the receiving module 110, the comparing module 130 compares the received identification information with previously received identification information. The previously received identification information can be obtained from the storing module 120. Here, the previously received identification information, which is to be compared with the identification information provided from the receiving module 110, had preferably been received at least a first threshold time before the identification information provided from the receiving module 110 was received.

As a result of the comparison of the comparison module 130, if it is found that there is a piece of previously received identification information that is the same as the identification information provided from the receiving module 110, the geographic information setting module 140 matches the current geographic information of a mobile communication terminal to the identification information provided from the receiving module 110.

The control module 150 controls operations of modules of the apparatus for providing geographic information.

When a piece of identification information that is the same as the identification information to which geographic information is matched by the geographic information providing module 140 is received for longer than a second threshold time, the POI providing module 160 sets the geographic information matched to the identification information as a POI and provides the POI to a user through the display module 180 at the request of the user. The POI may be provided in the form of a text or an electric map.

The geographic information providing module 170 provides geographic information of a mobile communication terminal. To this end, the geographic information providing module 170 may include a position determining module 172 and a converting module 174 as illustrated in FIG. 5.

The position determining module 172 determines the position of the mobile communication terminal. The position determining module 172 may use a cell scheme, a GPS scheme, an angle of arrival (AOA) scheme, a time difference of arrival (TDOA) scheme, or an enhanced observed time difference (E-OTD) scheme for position measurement. However, the present embodiment is not limited thereto, and the position determining module 172 may determine the position of the mobile communication terminal using other schemes.

The converting module 174 converts position information obtained by the position measuring module 172 into geographic information. The position information indicates coordinate information of a position and the geographic information indicates the address or name of a local area corresponding to the position information. The converting module 174 can obtain a database required for converting position information into geographic information from the storing module 120.

In an embodiment of the present invention, the position measuring module 172 measures the position of the mobile communication terminal using a GPS and substitutes TM coordinates for WSG84 coordinates obtained as a result of position measurement. At this time, the converting module 174 may convert TM coordinates into geographic information corresponding to the TM coordinates and provide the geographic information to the geographic information setting module 140.

To allow a mobile communication terminal user to directly set a threshold value such as a threshold number or a threshold time in an embodiment of the present invention, the apparatus for providing geographic information may further include a user input module (not shown) and the control module 150 may set threshold values at a user's request input through the user input module.

The term "module", as used in the present description means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more computers in a communication system.

Hereinafter, an operation of the apparatus for providing geographic information according to an embodiment of the present invention will be described in more detail with reference to FIGS. 6 through 9. This method is, for ease of explanation only, described with reference to the apparatus of FIG. 1.

Figure 6:
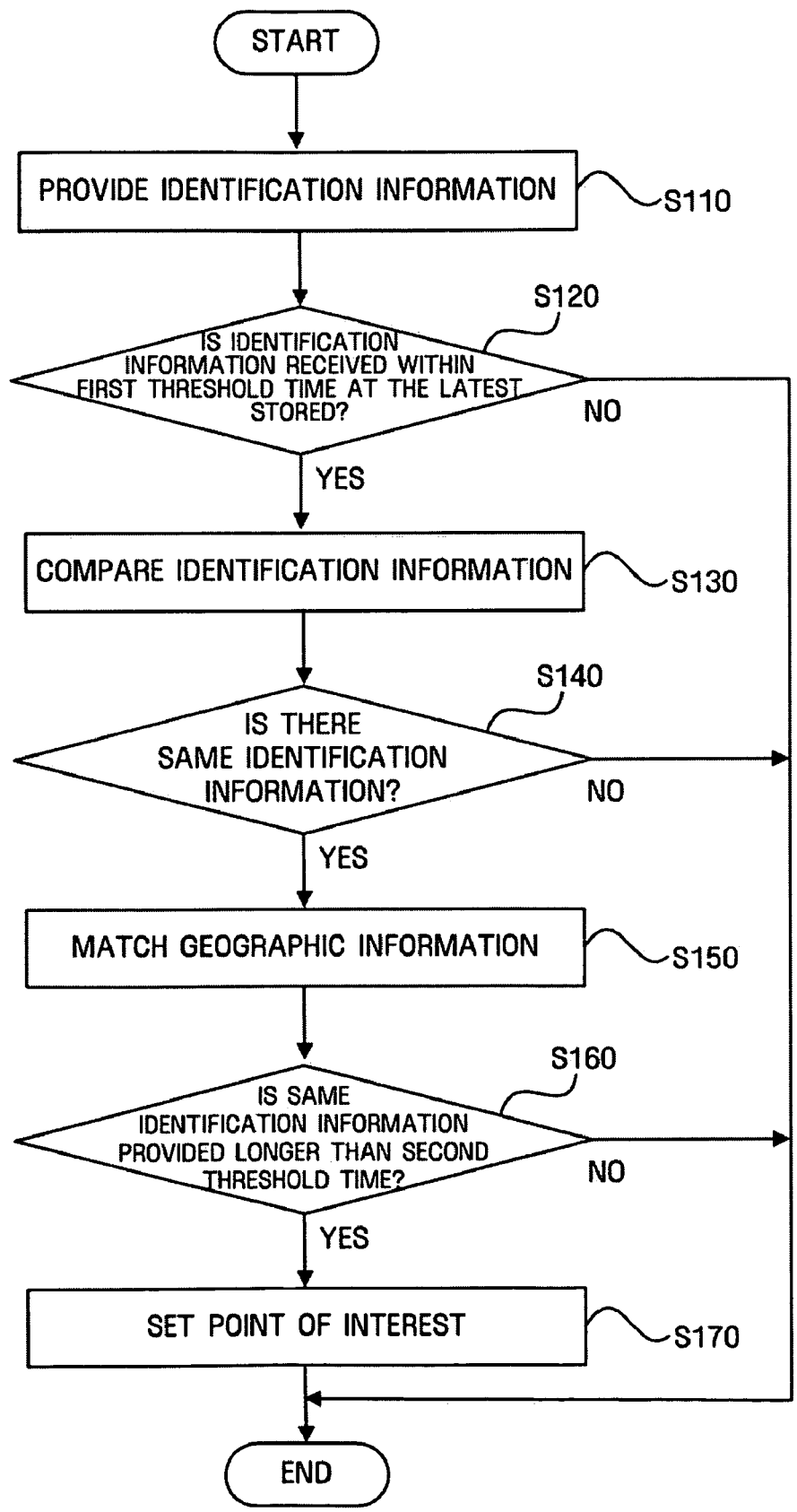
FIG. 6 is a flowchart illustrating a method for determining a mobile communication terminal user's point of interest according to an embodiment of the present invention.

FIG. 6 is a flowchart illustrating a method of determining a mobile communication terminal user's point of interest according to an embodiment of the present invention.

When the receiving module 110 provides identification information received from a mobile communication repeater in operation S110, the comparing module 130 checks if identification information received within the first threshold time at the latest before the receipt of the identification information provided from the receiving module 110 is stored in the storing module 120 in operation S120.

If the identification information received within the first threshold time at the latest before the receipt of the identification information provided from the receiving module 110 is stored in the storing module 120, the comparing module 130 compares the stored identification information and the identification information provided from the receiving module 110 in operation S130. If the identification information is not received within the first threshold time at the latest before the receipt of the identification information provided from the receiving module 110, the method ends.

If there is identification information that is the same as the identification information provided from the receiving module 110 among the stored identification information received within the first threshold time at the latest before the receipt of the identification information provided from the receiving module 110 in operation S140, the geographic information setting module 140 matches current geographic information of a mobile communication terminal to the identification information provided from the receiving module 110 in operation S150. At this time, the geographic information matched to the identification information, together with the identification information, may be stored in the storing module 120. If there is no identification information that is the same as the identification information provided from the receiving module, the method ends.

Next, the POI providing module 160 determines whether the identification information that is the same as the identification information to which the geographic information is matched is continuously received longer than the second threshold time in operation S160. If the identification information that is the same as the identification information to which the geographic information is matched is not continuously received longer than the second threshold time, the method ends.

If the identification information that is the same as the identification information to which the geographic information is matched is provided longer than the second threshold time, this means that a mobile communication terminal user stays for a long time in the same area. Thus, the POI providing module 160 sets the geographic information matched to the identification information as a mobile communication terminal user's POI in operation S170. The geographic information set as a POI may be provided to the mobile communication user through the display module 180 at the request of the mobile communication user.

Figure 7:
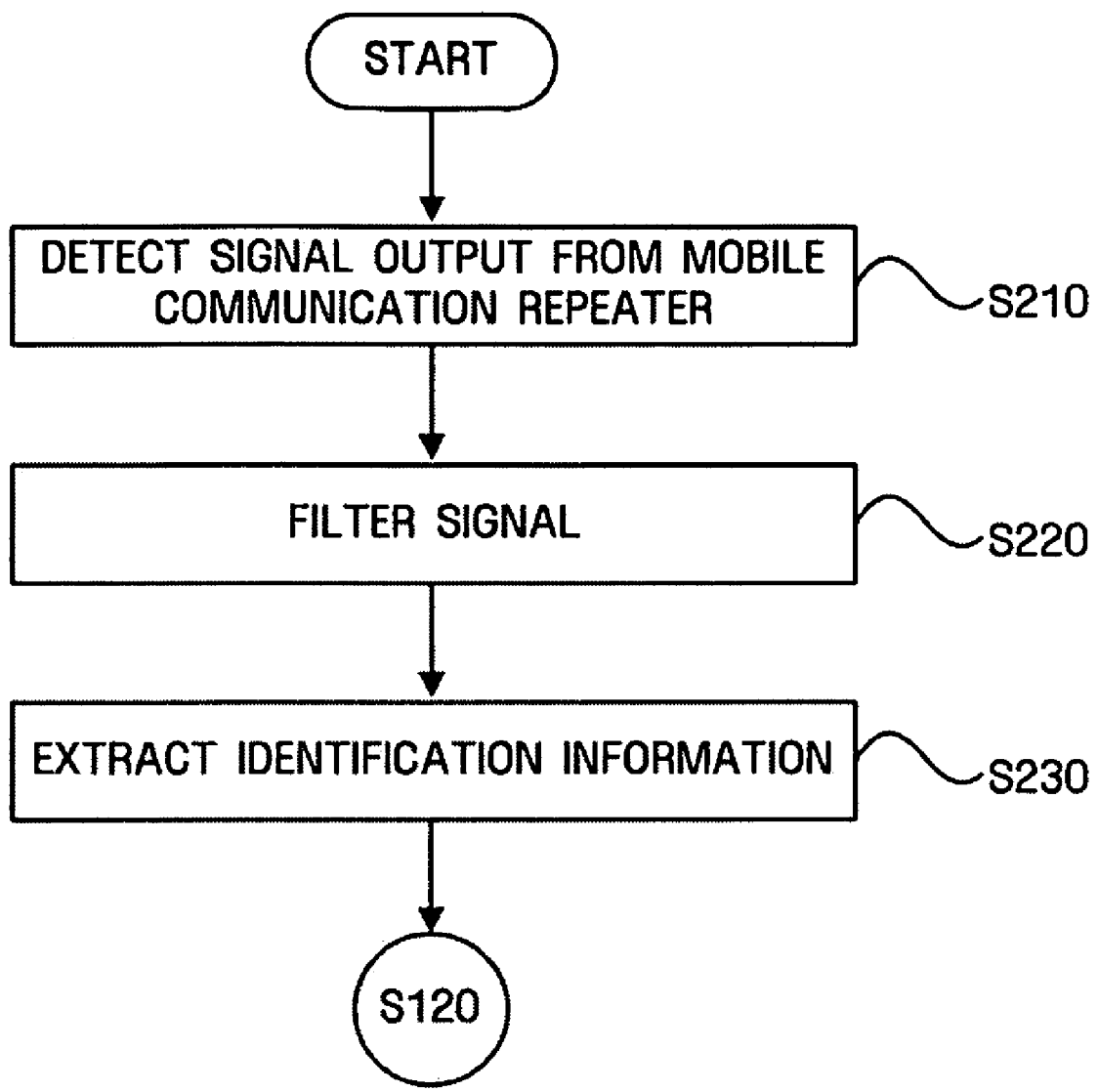
FIG. 7 is a detailed flowchart illustrating a process of providing identification information in FIG. 6.

FIG. 7 is a detailed flowchart illustrating operation S110 of FIG. 6.

Referring to FIGS. 1 and 7, first, the signal detecting module 112 detects a signal output from a mobile communication repeater. At this time, it is preferable, but not necessarily, that signal detection be performed periodically and a detection period may be preset or be set by the mobile communication terminal user.

The filtering module 114 filters a threshold number of signals having greater strengths among signals detected by the signal detecting module 112 in operation S220.

Next, the identification information extracting module 116 extracts identification information included in signals filtered by the filtering module 114 in operation S230. At this time, the extracted identification information, together with the receipt time thereof, is stored in the storing module 120 and is provided to the comparing module 130.

According to another exemplary embodiment of the present invention, in operation S220, the filtering module 114 may primarily filter signals whose strengths are greater than a threshold strength among signals provided from the signal detecting module 112 and secondarily filter a threshold number of signals having greater strengths among the primarily filtered signals. And then, in operation S230, the identification information extracting module 116 may extract identification information included in the signals that are secondarily filtered by the filtering module 114.

Figure 8:
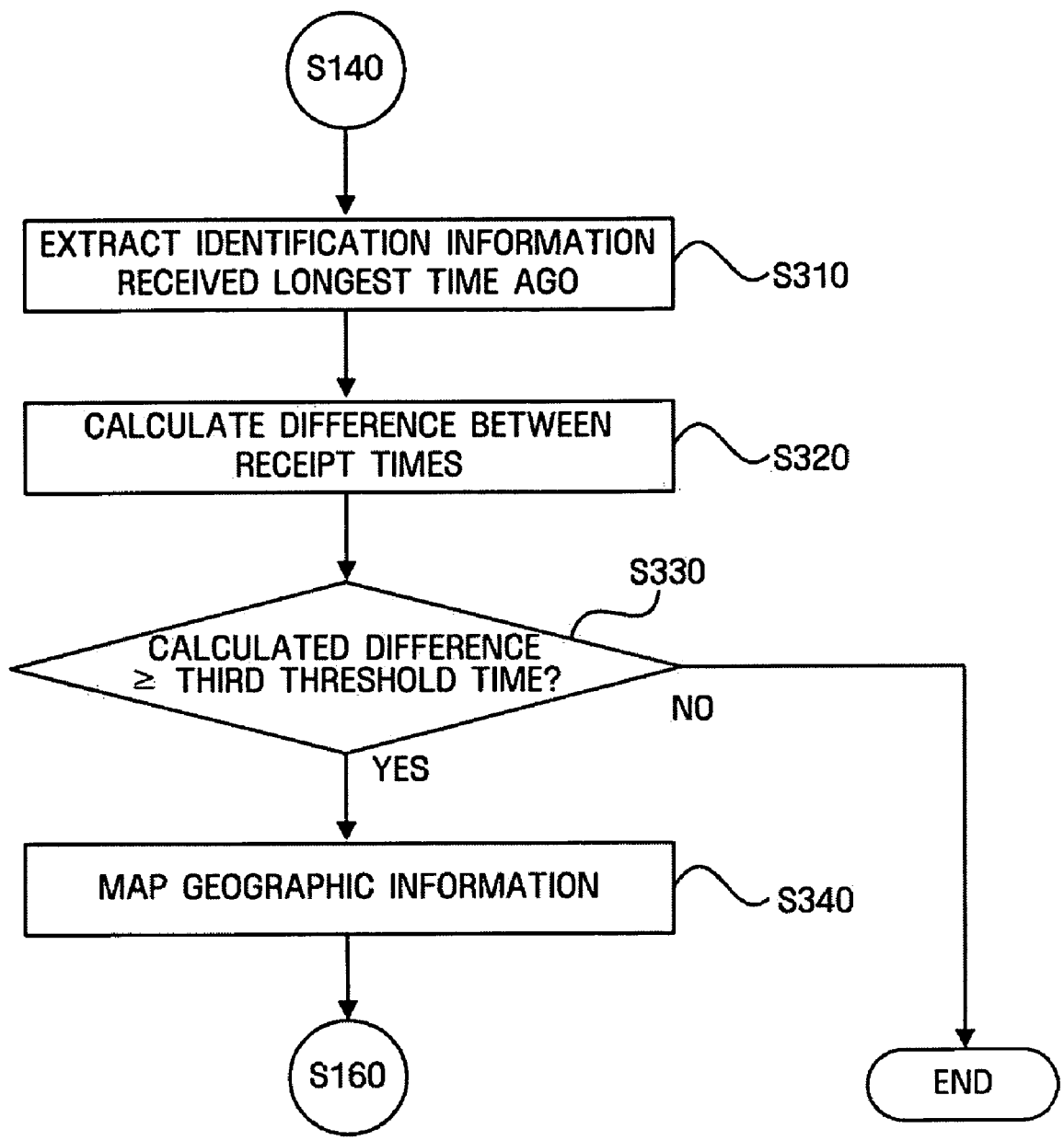
FIG. 8 is a detailed flowchart illustrating a process of matching geographic information to identification information provided from a receiving module in FIG. 6.

FIG. 8 is a detailed flowchart illustrating operation S150 of matching geographic information to identification information provided from the receiving module 110 in FIG. 6.

Referring to FIGS. 1 and 8, in operation S140 of FIG. 6, if there is identification information that is the same as identification information provided from the receiving module 110 as a result of comparison of the comparing module 130, the geographic information setting module 140 extracts identification information received the longest time ago among the identification information that is the same as identification information provided from the receiving module 110 in operation S310.

The geographic information setting module 140 calculates a difference of the receipt times of the extracted identification information and the identification information provided from the receiving module 110 in operation S320. If the calculated difference is greater than a third threshold time in operation S330, the geographic information setting module 140 maps current geographic information to the identification information provided from the receiving module 110 in operation S340. If the calculated difference is greater than a third threshold time, the method ends.

Figure 9:
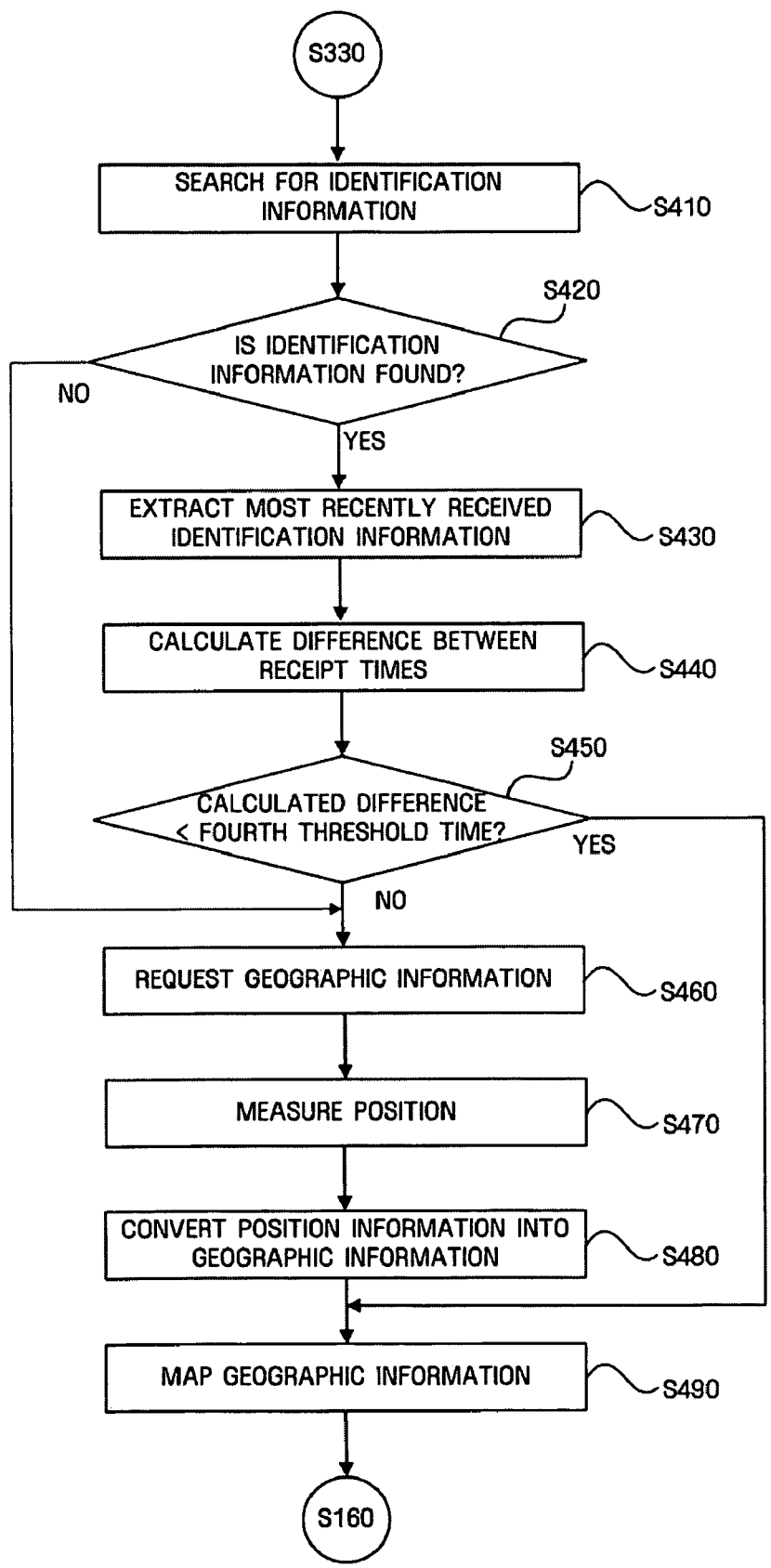
FIG. 9 is a detailed flowchart illustrating a geographic information mapping process of FIG. 8.

FIG. 9 is a detailed flowchart illustrating operation S340 of FIG. 8.

Referring to FIGS. 1 and 9, the calculated difference is greater than the third threshold time in operation S330 of FIG. 8, the geographic information setting module 140 searches in the storing module 120 for identification information to which geographic information is matched among the identification information that is the same as the identification provided from the receiving module 110 in operation S410.

If the identification information to which geographic information is matched is found in operation S420, the geographic information setting module 140 extracts most recently received identification information among the found identification information in operation S430 and calculates a difference between the receipt times of the extracted identification information and the identification information provided from the receiving module 110 in operation S440.

If the calculated difference is less than a fourth threshold time in operation S450, the geographic information setting module 140 maps geographic information mapped to the extracted identification information to the identification information provided from the receiving module 110 in operation S490.

If the identification information to which geographic information is matched is not found in operation S420 or the calculated difference is greater than the fourth threshold time, the geographic information setting module 140 requests geographic information from the geographic information providing module 170 in operation S460.

At this time, the position measuring module 172 included in the geographic information providing module 170 measures the current position of a mobile communication terminal in operation S470 and the converting module 174 converts position information obtained as a result of position measurement into geographic information in operation S480.

The geographic information setting module 140 maps the converted geographic information to the identification information provided from the receiving module 110 in operation S490.

According to an embodiment of the present invention, previously provided geographic information is provided while a mobile communication terminal user stays in the same area, thereby avoiding unnecessary position measurement.

It can be advantageous to perform operations S440 and S450 when a plurality of mobile communication repeaters use the same identification information such as a PN. Thus, when unique identification information assigned to each mobile communication repeater such as a BID is used, operations S440 and S450 may be omitted. In this case, if the identification information to which geographic information is matched is found in operation S420, the geographic information setting module 140 may map geographic information mapped to the identification information extracted in operation S430 to the identification information provided from the receiving module 110 in operation S490.

The method for deciding mobile communication terminal user's point of interesting and apparatus for providing geographic information using the same according to the above-described embodiments of the present invention provides at least the following advantages.

First, geographic information of an area where a mobile communication terminal user stays for a predetermined time can be provided as a mobile communication terminal user POI.

Second, power consumption caused by position measurement can be reduced.

Third, the amount of computation required for position measurement can also be reduced.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of determining a mobile communication terminal user's point of interest, the method comprising:

providing identification information received from a mobile communication repeater, the identification information being usable to identify a location of the user in relation to a plurality of mobile communication repeaters;

matching geographic information of a mobile communication terminal to the provided identification information when there is the same identification information as the provided identification information among previously recorded pieces of identification information within a first threshold time duration at the latest before receiving the provided identification information; and providing the geographic information as point of interest when identification information that is the same as the identification information to which the geographic information is matched is provided for longer than a second threshold time.

2. The method of claim 1, wherein the identification information is pseudo noises or base station identifier outputs from mobile communication repeaters.

3. The method of claim 1, wherein the providing identification information comprises:

detecting signals from the plurality of mobile communication repeaters;

filtering a threshold number of strong signals among the detected signals sorted in an decreasing order of signal strength; and extracting the identification information from the filtered signals.

4. The method of claim 1, wherein the matching comprises:

primarily searching for identification information that is the same as the provided identification information among a sequence of identification information received within a first threshold time at the latest before the receipt of the provided identification information; and mapping the geographic information to the provided identification information when a difference between the receipt times of identification information received the earliest among a sequence of primarily searched identification information and the provided identification information is greater than a third threshold time.

5. The method of claim 4, wherein the mapping comprises:

secondarily searching for identification information which is the same as the provided identification information and to which predetermined geographic information is matched among the sequence of identification information received at the latest before the receipt of the provided identification information; and mapping geographic information to the provided identification information, when the geographic information is matched among the list of found identification information to one of the list of the most recently received identification information, when a time lag between the receipt time of the most recently received identification information among the list of the secondarily searched identification information and the receipt time of the provided identification information is less than a fourth threshold time.

6. The method of claim 5, further comprising, when the identification information which is the same as the provided identification information and to which predetermined geographic information is matched is not found in a list of the secondarily searched identification information, or when the time lag between the receipt times of the most recently received identification information among the secondarily searched identification information and the provided identification information is greater than the fourth threshold time, measuring a current position of the mobile communication terminal;

providing geographic information corresponding to the measured position; and mapping the provided geographic information to the provided identification information.

7. An apparatus for providing geographic information of a mobile communication terminal, the apparatus comprising:

a receiving module which provides identification information received from a mobile communication repeater being usable to identify the mobile communication repeater;

a geographic information setting module which matches geographic information of a mobile communication terminal to the provided identification information when there is identification information that is the same as the provided identification information among identification information received within a first threshold time at the latest before receipt of the provided identification information; and a point-of-interest providing module which provides the geographic information as the mobile communication terminal user's point of interest when identification information that is the same as the identification information to which the geographic information is matched is provided for longer than a second threshold time.

8. The apparatus of claim 7, wherein the identification information is a pseudo noise or a base station identifier output from the mobile communication repeaters.

9. The apparatus of claim 7, wherein the receiving module comprises:

a signal detecting module which periodically detects signals output from a plurality of the mobile communication repeaters;

a filtering module which filters a threshold number of signals having strong strengths among the sorted sequence of detected signals by the signal detecting module; and an identification-information-extracting module which extracts the identification information from the filtered signals.

10. The apparatus of claim 7, wherein the geographic information setting module primarily searches for identification information that is the same as the provided identification information among a list of the identification information received within the first threshold time at the latest before the receipt of the provided identification information, and maps the geographic information to the provided identification information when a time lag between a receipt time of the matched identification information received at a longest time ago among the list of the primarily searched identification information and a receipt time of the provided identification information is greater than a third threshold time.

11. The apparatus of claim 10, wherein the geographic information setting module secondarily searches for identification information which is the same as the provided identification information and to which predetermined geographic information is matched among the list of identification information received before the receipt of the provided identification information, and maps geographic information matched to most recently received identification information among the list of found identification information to the provided identification information when a time lag between a receipt times of the most recently received identification information along the sequence of the secondarily searched identification information and the receipt time of the provided identification information is less than a fourth threshold time.

12. The apparatus of claim 10, further comprising a geographic information providing module which measures the current position of the mobile communication terminal and provides geographic information corresponding to the measured position, wherein when the identification information which is the same as the provided identification information and to which predetermined geographic information is matched is not found or a difference between the receipt times of the most recently received identification information among the secondarily searched identification information and the provided identification information is greater than the fourth threshold time, the geographic information setting module maps the geographic information provided form the geographic information providing module to the provided identification information.

13. A method of determining a point of interest, the method comprising:

receiving, from at least one mobile communication repeater, identification information usable to identify a location of a user in relation to the at least one mobile communication repeater;

determining whether there is present stored identification information received within a first threshold time before receipt of the received identification information and, when there is present such stored identification information, comparing the stored identification information with the received identification information to identify identical identification information;

matching geographic information of a mobile communication terminal to the received identification information when there is stored identification information that is identical to the received identification information;

determining whether the stored identification information that is identical to the received identification information to which the geographic information is matched is received for longer than a second threshold time; and providing the geographic information as point of interest when identification information that is the same as the identification information to which the geographic information is matched is provided for longer than a second threshold time.

14. The method of claim 13, wherein the receiving comprises filtering a threshold number of received information signals in an increasing order of signal strength.

15. The method of claim 13, wherein the receiving comprises:

primarily filtering received information signals whose strengths are greater than a threshold strength; and secondarily filtering a threshold number of signals among the primarily filtered signals in an increasing order of signal strength.

* * * * *

UNITED STATES PATENT AND TRADEMARK OFFICE
CERTIFICATE OF CORRECTION

| | |
|---|---|
| PATENT NO. | : 7,660,589 B2 |
| APPLICATION NO. | : 11/435794 |
| DATED | : February 9, 2010 |
| INVENTOR(S) | : Hee-Seob Ryu et al. |

Page 1 of 1

It is certified that error appears in the above-identified patent and that said Letters Patent is hereby corrected as shown below:

Column 9, Line 38, change "an" to --a--.

Signed and Sealed this

Fourth Day of May, 2010

David J. Kappos
*Director of the United States Patent and Trademark Office*